Oct. 17, 1944.     E. F. FLINT     2,360,667
NAVIGATION WATCH
Filed Sept. 5, 1942
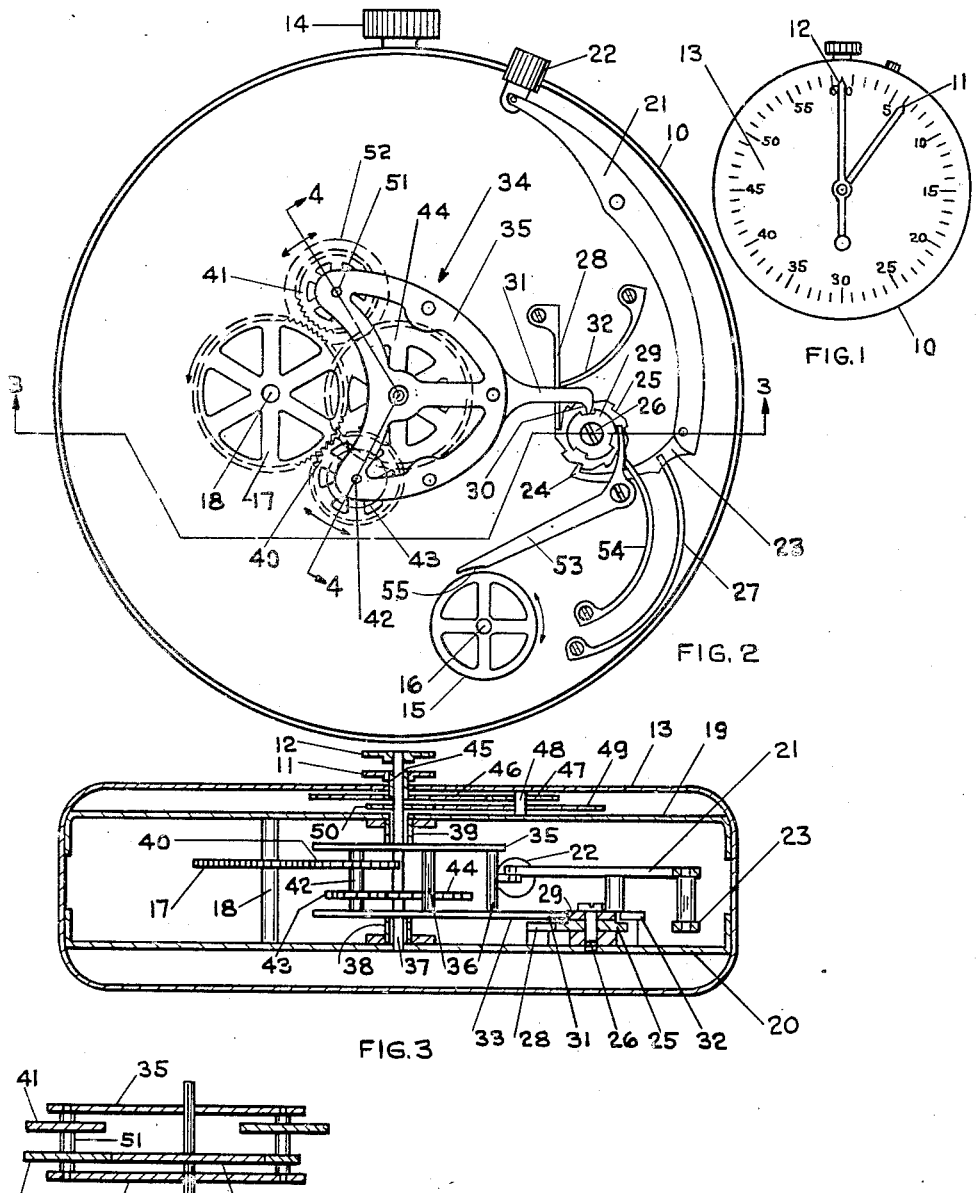
EDWARD F. FLINT
INVENTOR Patented Oct. 17, 1944

2,360,667

UNITED STATES PATENT OFFICE 2,360,667

NAVIGATION WATCH

Edward F. Flint, Rochester, N. Y., assignor to Bausch & Lomb Optical Company, Rochester, N. Y., a corporation of New York Application September 5, 1942, Serial No. 457,421

12 Claims. (Cl. 161—15)

This invention relates to time-keeping and indicating devices and more particularly to such a device for evaluating and indicating the average civil time of a period of time consumed in completing a series of events.

The device of the present invention is useful in a number of arts where it is desirable to know the average time of a series of events. It is particularly useful in aerial navigation for determining the average civil time of the period of time consumed in completing a series of celestial observations and by way of illustration, the device of the present invention will be described as a watch for navigators.

Accurate navigation depends to a very large extent on the accuracy with which an observer can determine his position with relation to some known celestial body and to increase the accuracy of a measurement of the angular elevation of the body, an observer will take a series of measurements and then through some suitable mechanism, determine the average or median value of the series of measurements. This to a considerable extent obviates errors in the measurement of the inclination of the celestial body but as some time is consumed in taking the series of readings, it is necessary to take into account the movement of the celestial body during the period of time elapsed from the first to the final reading of the series of measurements.

To minimize the errors produced by movement of the body during the time the series of measurements are being made, the civil time of the first measurement is noted as well as the last and the time of the series is found by subtracting the time of the first measurement from that of the last. This gives the total time consumed and by dividing the total time by two and adding this result to the time of the first reading, an average civil time is found which can be used as the time of the average or median reading.

The steps of determining the civil time to be used in the calculation for locating position as it increases the amount of calculations, as well as the time of compiling the same, also increases the possibility of error. This is extremely dangerous, for an error of four seconds of time results in an error in position of approximately one mile.

The device of the present invention eliminates the calculations necessary to determine the time to be used, for it provides an arrangement whereby the time is evaluated and may be read directly from the scale of the device. Thus the device of the present invention not only reduces the time of determining position but as it eliminates the steps of evaluating the time, also eliminates the possibility of error which the steps introduced into the calculations.

To simplify the device and to reduce the cost thereof, the hour hand has been dispensed with for in most uses and particularly where the device is used as a navigation instrument, there is no need for an hour hand as aircraft are fitted with chronometers. The device, where used as a navigation instrument, can be synchronized quite easily with the chronometer of the aircraft so that the device will indicate minutes and seconds in synchronism with the corresponding hands or indicators of the chronometer.

Thus the device comprises a minute and second hand driven by suitable clock mechanism over a dial somewhat similar to the dial of a conventional stopwatch. Means are provided for reducing the rate of movement of the hands over the dial and as the reduced rate is just one-half of the normal rate of movement, selective operation of this means is used in the present invention to evaluate the average time to be used in the calculations.

In use after the hands of the device have been synchronized with the hands of the chronometer, the observer proceeds to take his first observation at which time he actuates the speed reduction means so that thereafter the hands travel about the dial of the device at one-half the rate of speed until the final observation of the series is made, at which time the movement of the hands over the dial is stopped and the hands will indicate directly the average civil time of the period during which the series of measurements were taken. It will be seen that the time that will be indicated by the hands of the device will be that time which heretofore has been arrived at by subtracting the time of the first observation from the time of the last and dividing this result by two and then adding this time to the civil time of the first observation.

The device of the present invention therefore not only reduces the possibility of error by eliminating the calculations necessary to determine the average civil time of the series of observations, but also reduces the time in which the position calculations can be made.

Furthermore, the device is compact and can be carried as an ordinary pocket watch. As it is small and easily handled, it does not encumber the observer who generally must work with limited equipment in the small space available to him in the aircraft.

Other objects and advantages of the present invention will appear in the following description taken in connection with the accompanying drawing in which:

Fig. 1 is a top plan view of the device of the present invention.

Fig. 2 is a top plan view of the device of the present invention with the dial and a portion of the casing removed to show the operating mechanism.

Fig. 3 is a section taken along line 3—3 of Fig. 2 but showing the hands and dial of the device.

Fig. 4 is a section taken along line 4—4 of Fig. 2.

The device of the present invention, referring now to the drawing, comprises a casing 10 housing the operating mechanism for moving the hands 11 and 12 over the dial 13. The operating mechanism, referring now to Fig. 2, in the form of the invention shown, is adapted to be driven by a spring, not shown, such as the conventional main-spring of present-day watch movements. The driving spring is to be wound or tensioned and the position of the hands 11 and 12 selectively changed by the stem 14. The operating mechanism of the device of the present invention is driven by the driving or mainspring controlled by the usual balance wheel 15 mounted on a spindle 16.

The pinion 17 forming a part of the driving train and driven at a constant speed is adapted upon selective operation to drive the operating mechanism of the device. This pinion is carried by a spindle 18, the opposite ends of which are journaled in upper and lower frame plates 19 and 20, respectively.

The lower frame plate 20 carries the speed control means of the present invention which comprises a pivoted lever 21 carrying at one end thereof an operating knob 22 extending through an aperture in the casing 10. The opposite end of the lever 21 is connected to one end of an arm 23 carrying a pawl 24 operating over a ratchet wheel 25 rotatably mounted on a stubshaft 26 fixed to the frame plate 20. A leaf spring 27 holds the pawl 24 of the arm 23 against the ratchet wheel 25 and the lever 21 in a position with the knob 22 extending exteriorly of the casing 10.

When the knob 22 is depressed, the lever 21 rocks about its pivot and ratchet wheel 25 through the arm 23 and pawl 24 is rotated. In order to prevent the ratchet wheel from returning with the arm 23 when the knob 22 is released, a spring detent 28 fixed to the frame plate 20 engages and holds the wheel against such movement.

The ratchet wheel 25 in the now-preferred embodiment of the device of the present invention is employed to control the speed which the hands 11 and 12 are driven over the dial 13. To this end the shaft 26 carries a turret wheel 29 which is fixed to and rotates with the ratchet wheel 25. A follower 30 carried by a finger 31 is held against the working face of the turret wheel 29 by a leaf spring 32. The finger 31 may be formed integral with a frame member 33 forming a part of a cage 34 comprising the frame member 33 and an upper frame member 35 spaced apart by suitable pillars 36 of the form usual in watch and clock construction.

The cage 34 is rotatably carried by a spindle 37 journaled at its lower end in a bearing 38 fixed between the plate 20 and the frame member 33. The spindle extends above the cage 34 and is supported by a bearing 39 secured to the underneath surface of the frame plate 19. The bearings 38 and 39 also space the cage 34 from the upper and lower frame plates 19 and 20. The turret wheel 29 through follower 30 and arm 31 determines the position of the cage 34, the cage moving to alternate positions as the follower 30 rides into or out of the depressions of the turret wheel 29, and the position of the cage can be selectively adjusted by means of the operating knob 22.

The cage carries a change speed gear train comprising a pair of pinions 40 and 41 adapted to be alternately driven by the pinion 17 of the driving train in alternate positions of the cage 34. In the position shown in Fig. 2, the follower 30 is shown as resting within a depression of the turret wheel 29 and cage 34 in a position wherein pinion 40 is engaged and driven by pinion 17. Pinion 40 is carried by a spindle 42, the opposite ends of which are journaled in frame members 33 and 35. A pinion 43 fixed to spindle 42 drives a large pinion 44 carried by the spindle 37. The spindle 37 extends through the casing 10 and carries the hand 12.

The hand 11 is carried by a sleeve 45, extending through an aperture in the dial 13 and carrying beneath the dial a gear 46 meshing with a pinion 47 carried by a shaft 48 having the opposite ends thereof journaled in the dial 13 and frame plate 19. A pinion 49 fixed to spindle 48 meshes with a pinion 50 carried by the spindle 37. The ratio between the pinions 50, 49, 47 and 46 is such that the hand 12 will be driven at a rate of speed 60 times that of the speed of the hand 11.

The pinion 41 is fixed to a spindle 51 which is journaled in frame members 33 and 35. The spindle 51 carries a pinion 52 which engages and drives pinion 44 carried by the main spindle 37. The relative size of pinions 40 and 41, and their associated pinions 43 and 52 is such that with pinion 41 being driven by pinion 17, the rate of movement of the hands over the dial 13 will be twice as fast as when the pinion 40 is being driven by the pinion 17 of the driving train.

It will be seen, referring now to Fig. 2, that if knob 22 is depressed, the ratchet wheel 25 is rotated one tooth, which will carry turret wheel 29 to a position in which finger 31, as follower 30 is cammed upwardly by a turret of the wheel, is moved counterclockwise to rock cage 34 counterclockwise to the other of its alternate positions in which pinion 41 is engaged and driven by pinion 17. With pinion 41 and its associated pinion driving pinion 44, the hands 11 and 12 will move over dial 13 at a rate twice as fast as when pinion 40 was being driven.

Although in the illustrated position of the parts shown in Fig. 2, the next actuation of knob 22 will move pinion 41 into driving engagement with pinion 17, the entire mechanism of the device would be prevented from operating by the application of a brake to the balance wheel 15. The brake in the preferred form of the invention is applied as pinion 41 is moved into position to be driven by pinion 17. In the form of the device now preferred, the brake is actuated by the turret wheel 29 through a bell crank lever 53 pivoted on frame plate 20. The bell crank lever has an actuating arm held by leaf spring 54 against the working face of the turret wheel 29 and the free end of the other or actuated arm is formed with a braking surface 55 normally held out of engagement with the balance wheel 15, but movable into engagement therewith as the free end of the actuating lever rides into a depression on the turret wheel 29. Thus in the position shown in Fig. 2, the next actuation of the knob 22 will move the turret wheel a distance sufficient to allow the spring 54 to snap the end of the actuating arm of the lever 53 into a depression of the turret wheel 29 and the braking surface 55 against the balance wheel 15. The braking of the balance wheel, as will be understood, stops the entire mechanism of the device from operation and the hands will stop at the time the brake is applied.

To restart the device, it is merely necessary to again depress the operating knob 22. Actuation of the knob 22 in this cycle of the device will move the ratchet wheel one ratchet tooth and the turret wheel will revolve a distance sufficient to move the end of the actuating arm of the bell crank lever out of the depression and up onto the working space of the wheel. This relieves the brake from the balance wheel and the device immediately begins to operate.

The pinion 41 remains in engagement with the driving pinion 17 and the hands will be driven over the dial 13 at the rate of speed determined by the pinion 41 and its associated pinion 52. In order to maintain engagement between pinions 17 and 41, each turret of the wheel 29 is formed twice as long as each ratchet tooth of the wheel 25 and the follower 30 of the finger 31 will still be in engagement with one of the turrets of the wheel even though the knob 22 is again actuated after the pinion 41 is moved into engagement with pinion 17.

Although an hour hand has not been shown, if the device is to be used where an ordinary watch, clock, or chronometer is not available, an hour hand may be provided. Generally, if the instrument is to be used as a navigation instrument for aircraft, the hour hand can be dispensed with for aircraft equipped to determine position are fitted with chronometers.

In use, an observer by actuating the knob 22 can cause the device to indicate seconds and minutes in synchronism with the corresponding hands or indicators of the chronometer before he begins his series of observations. With the hands of the device in synchronism with the hands or recorders of the chronometer, the first observation is taken and at the time the first observation is made, the actuating knob 22 is depressed. As has been heretofore explained, this actuation of the knob causes the pinion 40 to move into driving connection with the pinion 17 and the gear train 40, 43 and 44 is such that the hands move over the dial at but one-half their normal rate of speed and indicate elapsed time in the half units thereof. The observer need not give any attention to the device until the last reading of the series is completed. When the last reading of the series is completed, he again depresses the actuating knob 22 to stop the mechanism. As the hands have been driven over the dial at half their normal speed, they will indicate on the dial one-half of the time elapsed between the first and last readings of the series. Thus, the device evaluates and indicates the average time of the period of time consumed in completing the series of observations.

It will be seen that the device of the present invention obviates the step of noting the time of the first and last of the observations and subtracting the time of the first observation from that of the last to derive the total time consumed in completing the series of observations which heretofore has been divided by two and then added to the civil time of the first reading to gain the average civil time of the series of observations.

As these steps have been eliminated, the possibility of error created by these steps has also been eliminated.

The device is compact and may be carried on the body of the observer or carried by a bracket secured to the octant or observation instrument being used. As the device is compact, it does not encumber the observer who generally must work with limited equipment in the small space available to him in the aircraft.

While one embodiment of the invention has been disclosed, it is to be understood that the invention need not be limited to the device as described, but is susceptible of modification falling within the spirit of the invention and the scope of the appended claims.

I claim:

1. A device for evaluating and indicating the average civil time of the period of time between any two preselected events in a series comprising a dial graduated in units of time; a pair of indicators movable over said dial; a clock movement for moving said indicators over said dial to indicate elapsed time in units thereof; and control means for controlling the operation of said clock movement, said means including means for reducing by half the rate of movement of said indicators over said dial, whereby said indicators for each unit of elapsed time indicate a half unit of time.

2. A device for evaluating and indicating the average civil time of a period of time consumed in completing a series of events comprising a pair of indicators; a dial graduated into units of time and divisions thereof; a clock movement for moving said indicators over said dial to indicate elapsed time in units and divisions thereof; and means cooperable with said clock movement for moving said indicators over said dial at one-half the rate of movement after the occurrence of the first event in said series whereby at the conclusion of said series said indicators will indicate directly on said dial the average time of the period of time between the occurrence of the first and last events of the series.

3. A device for evaluating and indicating the average of a period of time consumed in completing a series of events comprising a pair of indicators; a dial graduated into units of time and divisions thereof; a clock movement for moving said indicators over said dial to indicate elapsed time in units and divisions thereof; means cooperable with said clock movement for moving said indicators over said dial at one-half the rate of movement after the occurrence of the first event in said series; and means for stopping movement of said indicators at the conclusion of said series whereby said indicators will indicate directly on said dial the average time of the period of time between the occurrence of the first and last events of the series.

4. A device for evaluating and indicating the average of a period of time consumed in completing a series of events comprising constant speed means; an indicator; a dial graduated in units of time; means for connecting said indicator to said constant speed means for moving said indicator over said dial to indicate elapsed time in units thereof; change speed means having a ratio of one to two; means for connecting said indicator to said constant speed means through said change speed means at the occurrence of the first event in said series whereby said indicator thereafter moves over said dial at half the rate of speed to indicate elapsed time in half units thereof;

and means for stopping movement of said indicator at the final event of the series.

5. A device for indicating the mean time in which a series of events occurred comprising constant speed means; an indicator; a dial graduated in time units; means for connecting said indicator to said constant speed means for moving said indicator over said dial to indicate elapsed time in units thereof; change speed means having a ratio of one to two; manually operable means for connecting said indicator to said constant speed means through said change speed means simultaneously with the occurrence of the first event in the series whereby said indicator thereafter moves over said dial at half the rate of speed; and manually operable means for stopping said constant speed means to stop said indicator at the final event of the series, said indicator indicating the mean time of the period consumed in completing the series.

6. A device for evaluating and indicating the average of a period of time consumed in completing a series of events comprising constant speed driving means; at least one indicator; a dial graduated in units of time; gear means for connecting said indicator to said constant speed means for moving said indicator over said dial to indicate elapsed time in units thereof; gear means separate from said first-named gear means for moving said indicator over said dial at a speed at which said indicator indicates elapsed units of time in half units thereof; means for connecting said indicator to said constant speed means through said last-named gear means at the occurrence of the first event in said series whereby said indicator thereafter moves over said dial at half the rate of speed; and means for stopping movement of said indicator at the final event of the series.

7. A device for evaluating and indicating the average of a period of time consumed in completing a series of events comprising an indicator; a scale divided into units of time; a clock movement for moving said indicator over said scale to indicate elapsed time in units thereof; means for connecting said indicator to said clock movement; change speed means, said means adapted to reduce by one-half the rate of movement of said indicator when connected between said indicator and said clock movement; means for connecting said indicator to said clock movement through said change speed means at the occurrence of the first event in said series whereby said indicator thereafter moves over said scale at one-half the rate of movement; and means for stopping movement of said indicator coincident with the occurrence of the final event of the series whereby said indicator will directly indicate the average of the time between the first and last events of said series.

8. A device for evaluating and indicating the average of the period of time elapsed between any two preselected events in a series comprising at least one indicator; a dial graduated in units of time; a clock movement comprising a driving train and balance wheel; a gear train for driving said indicator over said dial at a rate of speed whereby said indicator indicates a unit of time for each unit of elapsed time; a gear train for driving said indicator over said dial at one-half the first-named rate of speed whereby the same indicates one-half a unit of time for each unit of elapsed time; and means for seriately engaging said gear trains whereby said indicator will be driven over said dial at a normal rate of speed and at the occurrence of the first selected event the indicator is driven by said last-named gear train whereby at the occurrence of the other selected event in the series the indicator will indicate directly on said dial the average time between the occurrence of said two events.

9. A device for evaluating and indicating the average time of a series of events comprising a casing; a dial graduated in units of time; at least one indicator; a driving pinion; a frame mounted within said casing for movement between alternate positions; a pair of gear trains carried by said frame, each train having a pinion adapted to be moved into engagement with said driving pinion in alternate positions of said frame and connected with said indicator to move the same over said dial, one train moving said indicator over said dial at a rate of movement whereby said indicator indicates elapsed time in units thereof, the other of said trains moving said indicator at half the rate of movement of said first train; and manually operable means for alternately moving said frame to its alternate positions whereby said frame can be moved simultaneously with the occurrence of the first event of the series from its position wherein the first-named train is moving said indicator to the other of its positions thereby moving the pinion of said second-named train into engagement with said driving pinion so that at the completion of said series the indicator will indicate the average time of the series.

10. A device for evaluating and indicating the average time of a series of events comprising a casing; a dial graduated in units of time; at least one indicator; a watch train including a driving pinion; a frame mounted within said casing for movement between alternate positions; a pair of gear trains carried by said frame, each train having a pinion adapted to be moved into engagement with said driving pinion in alternate positions of said frame and connected with said indicator to move the same over said dial, one train moving said indicator over said dial at a rate of movement whereby said indicator indicates elapsed time in units thereof, the other of said trains moving said indicator at half the rate of movement of said first train; manually operable means for alternately moving said frame to its alternate positions whereby said frame can be moved simultaneously with the occurrence of the first event of the series from its position wherein the first-named train is moving said indicator to the other of its positions thereby moving the pinion of said second-named train into engagement with said driving pinion so that at the completion of said series the indicator will indicate the average time of the series; and brake means, made operative simultaneously with movement of said frame to its position wherein the pinion of said first-named train is engaged by said driving pinion, for holding said balance wheel against movement to arrest movement of said watch train.

11. A time indicating device; and means for controlling the operation of said device, said control means including means for reducing by half the time indicated by said device after an elapsed period of time so that actuation of said control means at the occurrence of the first event in a series of events causes said device to indicate directly at the occurrence of any selected event in said series the average time of the period between the first and said selected event of said series of events.

12. In a device of the type described, a dial;

an indicator; mechanism for moving said indicator over said dial to indicate elapsed time in units thereof; means for varying the rate of movement of said indicator over said dial, said means including means for causing said indicator to move over said dial at half the normal rate of movement when actuated at the occurrence of a preselected event in a series of events whereby said indicator in cooperation with said dial will indicate at the occurrence of any later preselected event in said series the mean time of the two selected events.

EDWARD F. FLINT.